(12) United States Patent
Kipp et al.

(10) Patent No.: US 11,252,194 B2
(45) Date of Patent: Feb. 15, 2022

(54) METHOD AND APPARATUS OF AUTOMATIC GENERATION OF A CONTENT SECURITY POLICY FOR A NETWORK RESOURCE

(71) Applicant: CLOUDFLARE, INC., San Francisco, CA (US)

(72) Inventors: Jesse Kipp, Austin, TX (US); Patrick Meenan, South Riding, VA (US)

(73) Assignee: CLOUDFLARE, INC., San Francisco, CA (US)

( * ) Notice: Subject to any disclaimer, the term of this patent is extended or adjusted under 35 U.S.C. 154(b) by 283 days.

(21) Appl. No.: 16/505,322

(22) Filed: Jul. 8, 2019

(65) Prior Publication Data
US 2021/0014273 A1    Jan. 14, 2021

(51) Int. Cl.
*H04L 29/06* (2006.01)

(52) U.S. Cl.
CPC .......... *H04L 63/20* (2013.01); *H04L 63/0281* (2013.01); *H04L 63/102* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,990,392 B1* | 3/2015 | Stamos | .................. | H04L 43/50 709/224 |
| 9,015,844 B1* | 4/2015 | Franklin | ............... | G06F 21/577 726/25 |
| 9,325,739 B1* | 4/2016 | Roth | .................... | G06F 3/04842 |
| 10,606,576 B1* | 3/2020 | Tung | ........................ | G06F 21/31 |
| 10,762,195 B2* | 9/2020 | Wang | ........................ | G06F 21/53 |
| 2014/0325586 A1* | 10/2014 | Halliday | ............... | H04W 12/12 726/1 |
| 2016/0094575 A1* | 3/2016 | Shekyan | ............... | H04L 63/168 726/25 |

(Continued)

OTHER PUBLICATIONS

Kettle J., et al., "Practical Web Cache Poisoning," PortSwigger Web Security Blog, Retrieved from Internet URL: https://portswigger.net/blog/practical-web-cache-poisoning>, Aug. 9, 2018, 3 pages.

(Continued)

*Primary Examiner* — Harris C Wang
(74) *Attorney, Agent, or Firm* — Nicholson De Vos Webster & Elliott LLP

(57) ABSTRACT

Methods and apparatuses for automatic determination of a content security policy for a network resource are described. A proxy server receives from a first authenticated client device a first request for a first network resource, retrieves the first network resource and transmits a first response to the first client device that includes a content tracker that causes the client device to report information on additional network resources identified when the first client device interprets the first network resource. A content security policy is determined based on the reported information. The proxy server receives, from a second client device, a second request for the first network resource. The proxy server transmits, to the second client device, a second response that includes the content security policy that is determined based on the information on the additional network resources.

30 Claims, 7 Drawing Sheets

(56) References Cited

U.S. PATENT DOCUMENTS

| | | | | |
|---|---|---|---|---|
| 2016/0182537 A1* | 6/2016 | Tatourian | .............. | H04L 63/145 |
| | | | | 726/23 |
| 2016/0323309 A1* | 11/2016 | Sethi | ..................... | H04L 63/101 |
| 2017/0277892 A1* | 9/2017 | MacDermid | ........ | H04L 63/1466 |
| 2020/0128085 A1* | 4/2020 | Khait | .................... | H04L 67/142 |
| 2021/0014273 A1* | 1/2021 | Kipp | .................. | H04L 63/0281 |
| 2021/0029089 A1* | 1/2021 | Lewin | ................. | H04L 63/1408 |

OTHER PUBLICATIONS

MDN, "Content-Security-Policy-Report-Only," MDN Web Docs, Retrieved from Internet URL: https://developer.mozilla.org/en-US/docs/Web/HTTP/Headers/Content-Security-Policy-Report-Only> on May 2, 2019, 6 pages.

MDN, "Content-Security-Policy," MDN Web Docs, Retrieved from Internet URL: https://developer.mozilla.org/en-US/docs/Web/HTTP/Headers/Content-Security-Policy> on May 2, 2019, 9 pages.

MDN, "Cross-Site Scripting," MDN Web Docs, Glossary Definitions of Web-related terms, Retrieved from Internet URL: https://developer.mozilla.org/en-US/docs/Glossary/Cross-site_scripting> on May 2, 2019, 2 pages.

* cited by examiner

```
┌─────────────────────────────────────────────────────────────────────────┐
│  DETERMINE A CONTENT TRACKER FOR A FIRST NETWORK RESOURCE [AND WHERE THE CONTENT │
│    TRACKER INCLUDES A LOCATION AT WHICH THE INFORMATION ON THE ADDITIONAL NETWORK│
│           RESOURCES IS TO BE TRANSMITTED BY THE FIRST CLIENT DEVICE]             │
│                                    302                                           │
│                                                                                  │
│   ┌──────────────────────────────────────────────────────────────────────────┐  │
│   │   THE CONTENT TRACKER IS AN INITIAL CONTENT SECURITY POLICY THAT IS TO BE │  │
│   │     ENFORCED BY THE FIRST CLIENT DEVICE WHEN THE FIRST CLIENT DEVICE      │  │
│   │                 INTERPRETS THE FIRST NETWORK RESOURCE                     │  │
│   │                                  304                                      │  │
│   │  ┌──────────────────────────────────────────────────────────────────┐    │  │
│   │  │   THE INITIAL CONTENT SECURITY POLICY CAUSES THE FIRST CLIENT    │    │  │
│   │  │     DEVICE TO REPORT THE ONE OR MORE ADDITIONAL NETWORK          │    │  │
│   │  │  RESOURCES ACCESSED BY THE FIRST CLIENT DEVICE WHEN THE FIRST    │    │  │
│   │  │   CLIENT DEVICE INTERPRETS THE FIRST NETWORK RESOURCE, AND       │    │  │
│   │  │  WHERE THE INITIAL CONTENT SECURITY POLICY DOES NOT CAUSE THE    │    │  │
│   │  │     FIRST CLIENT DEVICE TO BLOCK THE ONE OR MORE ADDITIONAL      │    │  │
│   │  │                      NETWORK RESOURCES                           │    │  │
│   │  │                              306                                 │    │  │
│   │  └──────────────────────────────────────────────────────────────────┘    │  │
│   │                                                                          │  │
│   │  ┌──────────────────────────────────────────────────────────────────┐    │  │
│   │  │   THE INITIAL CONTENT SECURITY POLICY CAUSES THE FIRST CLIENT    │    │  │
│   │  │     DEVICE TO REPORT AND BLOCK THE ONE OR MORE ADDITIONAL        │    │  │
│   │  │   NETWORK RESOURCES ACCESSED BY THE FIRST CLIENT DEVICE WHEN     │    │  │
│   │  │  THE FIRST CLIENT DEVICE INTERPRETS THE FIRST NETWORK RESOURCE   │    │  │
│   │  │                              308                                 │    │  │
│   │  └──────────────────────────────────────────────────────────────────┘    │  │
│   └──────────────────────────────────────────────────────────────────────────┘  │
│                                                                                  │
│   ┌──────────────────────────────────────────────────────────────────────────┐  │
│   │     THE CONTENT TRACKER INCLUDES CODE INJECTED IN THE FIRST NETWORK      │  │
│   │  RESOURCE TO TRACK THE ADDITIONAL NETWORK RESOURCES THAT ARE ACCESSED    │  │
│   │       WHEN THE CLIENT DEVICE INTERPRETS THE FIRST NETWORK RESOURCE       │  │
│   │                                  310                                     │  │
│   └──────────────────────────────────────────────────────────────────────────┘  │
└─────────────────────────────────────────────────────────────────────────────────┘
                                         │
                                         ▼
┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐
│ TRANSMIT THE CONTENT TRACKER TO ONE OR MORE PROXY SERVERS THAT ARE OPERATIVE TO │
│   RECEIVE A REQUEST FOR THE FIRST NETWORK RESOURCE ON BEHALF OF AN ORIGIN SERVER│
│                       SERVING THE FIRST NETWORK RESOURCE                        │
│                                      312                                        │
└─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘
```

FIGURE 3

METHOD AND APPARATUS OF AUTOMATIC GENERATION OF A CONTENT SECURITY POLICY FOR A NETWORK RESOURCE

TECHNICAL FIELD

Embodiments of the invention relate to the field of network services; and more specifically to mechanisms for automatic generation of a content security policy for a network resource.

BACKGROUND ART

Code injection attacks allow an attacker to introduce (or "inject") code into a vulnerable computer program and change the course of execution of the computer program. For example, code injection attacks can be used to inject malicious content in trusted web resources. The result of successful code injection can be disastrous, for example, these attacks can be used for data theft, bypass of access controls, user impersonation, site defacement, distribution of malware, etc.

Content Security Policy (CSP) is a security standard introduced to prevent code injection attacks. CSP provides a standard method for owners of network resources (e.g., website) to declare approved origins of content that browsers should be allowed to load on that network resource. For example, CSP allows the determination of a policy that can cover several types of resources such as script language (e.g., JavaScript), style sheet language (e.g., Cascading Style Sheets (CSS)), Hypertext Markup Language (HTML) frames, web workers, fonts, images, embeddable objects such as Java applets, ActiveX, audio and video files, and other HTML5 features. To use the CSP technology, a network resource owner needs to determine a CSP policy and configure a CSP header to include the CSP policy. The CSP policy included in a CSP header can be used to restrict the domains from which network resources can be loaded from or whether inline or external elements are allowed in the network resource. A CSP header is a powerful tool to counter several types of code injection attacks.

Today, CSP policies and CSP headers need to be set by the owner of the network resource. However, setting a CSP header can be very complex and opaque to a domain owner.

BRIEF DESCRIPTION OF THE DRAWINGS

The invention may best be understood by referring to the following description and accompanying drawings that are used to illustrate embodiments of the invention. In the drawings:

FIG. 3 illustrates a flow diagram of exemplary operations for automatic generation of a content security policy for a network resource, in accordance with some embodiments.

DETAILED DESCRIPTION

Figure 1:
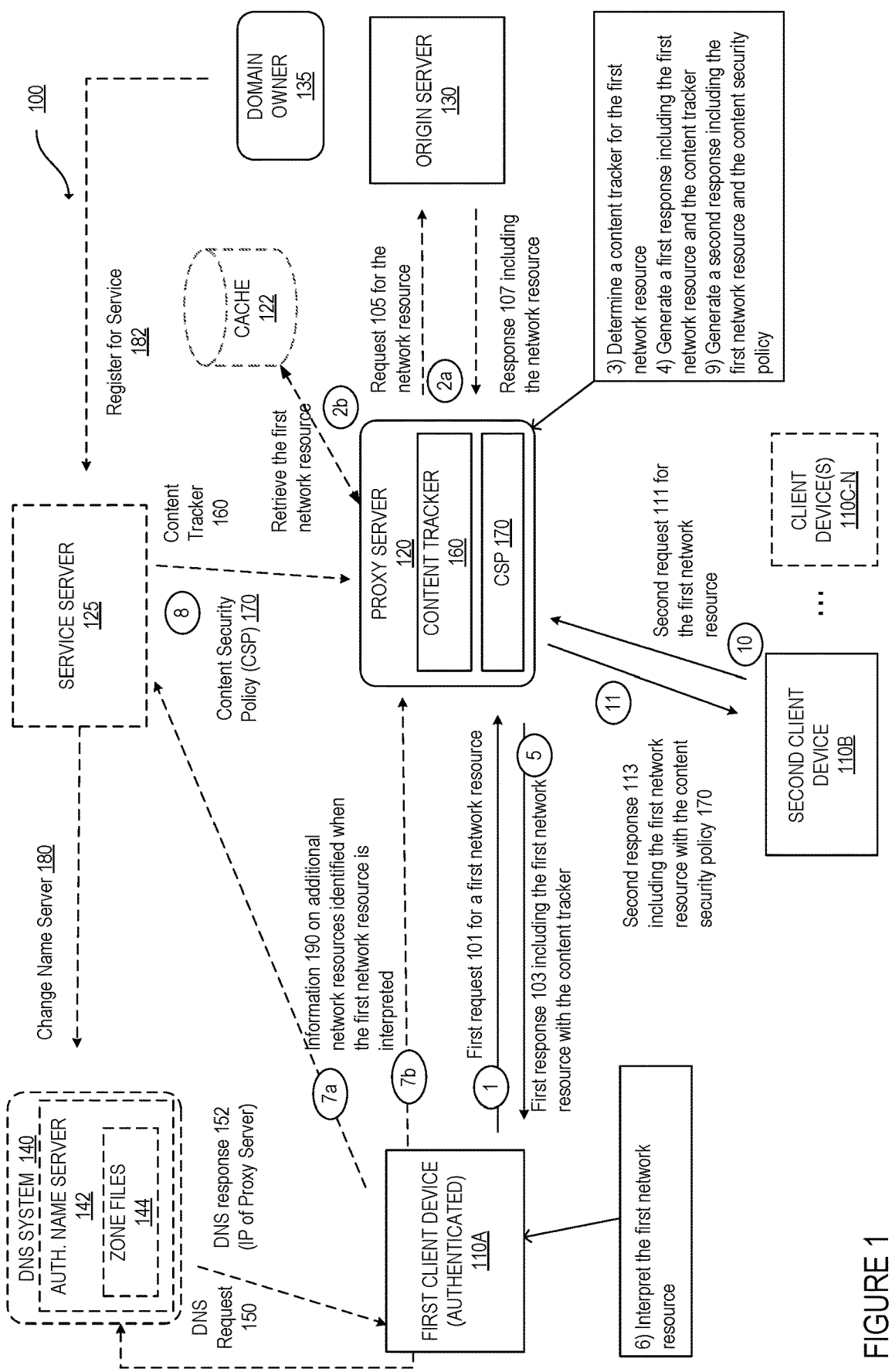
FIG. 1 illustrates a block diagram of an exemplary system for automatic generation of a content security policy for a network resource in accordance with some embodiments.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Throughout the following description similar reference numerals have been used to denote similar elements such as components, features of a system and/or operations performed in a system or element of the system, when applicable.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The embodiments presented herein describe methods and apparatuses for automatic determination of a content security policy for a network resource. In one embodiment, a proxy server of a cloud-based proxy service receives from a first client device a first request for a first network resource. The first client device is an authenticated client device. The proxy server retrieves the first network resource and transmits a first response to the first client device. The first response includes the first network resource and a content tracker that causes the client device to report information on one or more additional network resources that are identified when the first client device interprets the first network resource. A content security policy is determined based on the reported information. In some embodiments, the proxy server receives the reported information and determines the content security policy. In other embodiments, a different server receives the reported information and determines the content security policy, which is sent to the proxy server. The proxy server receives, from a second client device, a second request for the first network resource. The proxy server 120 transmits a second response to the second client device. The second response includes the first network resource and the content security policy that is determined based on the information on the one or more additional network resources. The content security policy identifies at least one of a source and type of network resources that the second client device can securely access when interpreting the first network resource.

The mechanisms described herein allow the determination of the content security policy to be transparent to an owner or administrator of the origin server hosting the network resource and does not require any effort on the part of the owner/administrator. The content security policy helps mitigate attacks on the client device and the first network resource. The automatically determined CSP can help mitigate and report cross site scripting (XSS) attacks and packet sniffing attacks. The use of the automatically generated CSP makes it possible for origin administrators/owners to reduce or eliminate the vectors by which XSS can occur without having to determine the CSP.

The automatically generated CSP can specify the domain(s) that the client device should consider to be valid sources of executable network resources (e.g., scripts). The client device will then only execute the network resources loaded in source files received from those whitelisted domains, ignoring all other resources (e.g., ignoring inline scripts and event-handling HTML attributes). The automatically generated CSP can also be generated to globally disallow any external network resource execution (e.g., disallow any external script execution). In addition to restricting the domains from which content can be loaded, the CSP can specify which protocols are allowed to be used; for example, a CSP can be automatically generated to specify that all content must be loaded using secure communication protocol (e.g., Hyper Text Transfer Protocol Secure (HTTPS)).

Thus, the mechanisms described herein allow for an automatic determination of a CSP that mitigates attacks on the client device when accessing a network resource without adding a burden on the network resource's owner to determine and set the policy. This presents significant advantages when compared to previous mechanisms in which the network resource's owner was required to determine and set the CSP.

FIG. 1 illustrates a block diagram of an exemplary system for automatic generation of a content security policy for a network resource in accordance with some embodiments. The system 100 includes a first client device 110A, a second client device 110B, a proxy server 120, an origin server 130, and a domain owner 135. The system may further include some optional components such as service server 125, DNS system 140, and one or more optional client devices 110C-N.

Each one of the client devices 110A-N is a computing device (e.g., laptop, workstation, smartphone, palm top, mobile phone, tablets, gaming system, set-top box, etc.) that is capable of accessing network resources (e.g., they include software such as client network applications (e.g., web browsers, mobile applications, etc.) that are capable of accessing network resources). In some embodiments, the client network applications are implemented based on web application program interfaces (APIs) enabling the client devices to request access to resources hosted on a server. Each one of the client devices 110A-N is operative to transmit a request for a network resource that is served by the origin server 130. Any number of client devices can be in communication with the proxy server 120.

The proxy server 120 is a computing device coupled with one or more client devices through a network (not illustrated). The proxy server 120 is part of a cloud-based proxy service which provides different services for customers (e.g., the domain owner 135). The proxy server 120 is situated between client devices (e.g., client device 110A, client device 110B) and the origin server 130. In one embodiment, the proxy server 120 is a reverse proxy server. Certain network traffic is received and processed through the proxy server 120. For example, web traffic (e.g., Hypertext Transfer Protocol (HTTP) requests/responses, Hypertext Transfer Protocol Secure (HTTPS) requests/responses, Deprecated Open-Specification Networking Protocol (SPDY) requests/responses, etc.) for domains of the origin server 130 may be received and processed at the proxy server 120. In one embodiment, the domain owner 135 is a customer of the cloud-based proxy service. The owner of the proxy server 120 is typically different than the owner of the origin server 130. In addition, the proxy server 120 is not typically part of the local network of the origin server 130. For example, the proxy server 120 is outside of the local area network of the origin server 130 and is typically not physically accessible by the owner/administrator of the origin server 130.

By way of example, the cloud-based proxy service may provide services including protecting against Internet-based threats (e.g., proactively stopping botnets, cleaning viruses, trojans, and worms, etc.), providing performance services for customers (e.g., acting as a node in a content delivery network (CDN) and dynamically caching customer's files closer to visitors, page acceleration, content optimization services, etc.), TCP stack optimizations, and/or other services. In one embodiment, the cloud-based proxy service provides a mechanism for automatic determination of a content security policy that protects the customer's network resources from code injection attacks. Code injection is used by an attacker to introduce (or "inject") code into a vulnerable computer program and change the course of execution. The result of successful code injection can be disastrous, for example by allowing computer worms to propagate. Code injection attacks can result in data loss or corruption, lack of accountability, or denial of access. Injection can sometimes lead to complete host takeover. Cross-site scripting (XSS) attacks are an example of code injection attacks that can be used against network resources served by the origin server 130.

Generally speaking, the proxy server 120 receives certain network traffic from the client devices 110A-N requesting Internet resources. For example, the proxy server 120 may receive requests for an action to be performed on an identified resource (e.g., an HTTP GET request, an HTTP POST request, other HTTP request methods, or other requests to be applied to an identified resource on an origin server) from the client device 110A. The request received from the client device 110A is destined for an origin server (e.g., origin server 130).

The proxy server 120 analyzes incoming traffic and takes one or more actions on the incoming traffic. The proxy server 120 causes the incoming traffic to be fulfilled. In some embodiments, the proxy server 120 may transmit the outgoing traffic to the appropriate origin server 130. For example, the proxy server 120 may receive a first request 101 for a network resource and may transmit the request 103 (e.g., an HTTP GET request) for the network resource to the origin server 130. The origin server 130 may transmit a response 107 (e.g., an HTTP response) with the requested resource to the proxy server 120. The proxy server 120 may analyze the incoming traffic including the response 107 and take one or more actions, including, for example, transmitting a response to the requesting client device 110A. The proxy server 120 may determine a content tracker for the first network resource included in the response 107 and may generate a first response 103 including the content tracker and the first network resource. In some embodiments, the proxy server 120 may also cache resources for the domains and respond to requests from client devices locally if the requested resource is in cache (e.g., stored in cache 122). For example, when the proxy server 120 receives the first request 101, instead of transmitting the request 105 and receiving the response 107, the proxy server may retrieve the first network resource from the cache 122. The proxy server 120 then generates the first response 103 with the content tracker and the first network resource. When the first response 103 is generated, the proxy server 120 transmits it to the client device 110A.

The proxy server 120 may also receive a second request 111 from a second client device 110B. The proxy server 120 analyzes the incoming traffic including the second request 111 for the first network resource. The proxy server 120 may generate a second response 113 including the first network resource and a content security policy (e.g., CSP 170), and may transmit the second response 113 to the second client device 110B.

In some embodiments, incoming traffic is received at a particular proxy server 120 as a result of a DNS request 150 for a domain of one of the domain owners 135 resolving 152 to an IP address of the proxy server 120. By way of example, DNS record(s) for the domain "example.com" may resolve to an IP address of a server 120. In some embodiments, multiple domains that may be owned by different domain owners may resolve to the same server 120 (e.g., the same IP address or a different IP address of the proxy server 120). For example, the domain owner 135 owns one or more domains (e.g., example.com) for which the proxy server 120 may receive requests. The proxy server 120 may receive requests for the resources at a given location of the domain (e.g., example.com/login).

The origin server 130 is an electronic device that serves network resources (e.g., web pages, images, word processing documents, PDF files movie files, music files, or other computer files). For example, the origin server 130 may host the domain of the domain owner 135 (e.g., example.com) and is operative to respond to requests for resources at that domain. In some embodiments, the origin server 130 may generate the network resource requested upon receipt of the request for the network resource. Although not illustrated in FIG. 1, it should be understood that the network resources of the origin servers may be stored separately from the device that responds to the requests.

In some embodiments, the domain owner 135 is a customer of a cloud-based service and registers their respective domain for the service (operation 182). For example, the authoritative name servers for each domain of the domain owner 135 may be changed to the authoritative name server 142 of the service at operation 180. It should be understood that the backup authoritative name server serving the domain may also be changed to an authoritative name server of the service. The zone file record for the domain is also changed (in the zone files 144) such that DNS resolution requests for the domain owned by the domain owner 135, which corresponds with the origin server 130, resolve to the proxy server 120. In one embodiment, a customer (e.g., the domain owners 135 or other entity (e.g., web administrators) on behalf of the domain owner 135) may use the service server 125 to change their authoritative name server to the authoritative name server 142 and change their zone file to have their domain point to the proxy server 120.

The service server 125 is an electronic device operated by the cloud-based proxy service, which provides a set of tools and interfaces for the domain owner 135 and is accessible over the Internet. For example, the service server 125, among other things, allows the domain owner 135 to register for the service, view statistics/logs of events, and report suspicious events. The service server 125 includes tools to assist the domain owner 135 in changing their authoritative name servers and zone file record. It should be understood, however, that the domain owner 135 may change their authoritative name server and zone file without use of the service server 125 (i.e., they may directly change the authoritative name server and zone file). The service server 125 includes tools to assist the domain owner 135 to select a set of services offered by the cloud-based proxy service.

The DNS system 140 is used to refer to the DNS system as a whole and includes multiple DNS servers to resolve DNS requests. As illustrated, the DNS system 140 includes the authoritative name server 142, which is an authoritative name server for the service. Thus, the authoritative name server 142 is the authoritative name server for the domains corresponding to the origin server 130. Accordingly, when the DNS system 140 resolves a request for a domain corresponding to the origin server 130, the authoritative name server 142 provides the authoritative answer. It should be understood that the DNS system 140 includes more DNS servers (e.g., preferred domain servers, top-level domain name servers, other domain servers) than illustrated. It should also be understood that there may be multiple authoritative web servers for the service, and they may be geographically distributed.

While FIG. 1 illustrates a single proxy server 120, in some embodiments the cloud-proxy service has multiple proxy servers that are geographically distributed. For example, in some embodiments, the service uses multiple point of presences (POPs). A POP is a collection of networking equipments (e.g., authoritative name servers and proxy servers) that are geographically distributed to decrease the distance between requesting client devices and content. The authoritative name servers have the same anycast IP address and the proxy servers have the same anycast IP address. As a result, when a DNS request is made, the network transmits the DNS request to the closest authoritative name server. That authoritative name server then responds with a proxy server within that POP. Accordingly, a visitor will be bound to that proxy server until the next DNS resolution for the requested domain (according to the TTL (time to live) value as provided by the authoritative name server). In some embodiments, instead of using an anycast mechanism, embodiments use a geographical load balancer to route traffic to the nearest POP. While FIG. 1 illustrates a single origin server 130 coupled with the proxy server 120, in some embodiments the server is coupled with multiple origin servers and/or with multiple client devices. Moreover, in some embodiments, there are multiple proxy servers providing service for a particular domain. For example, multiple proxy servers may receive requests for the first network resource hosted by the origin server 130.

In some embodiments, at operation (1), the client device 110A makes an initial request 101 for a first network resource at the origin server 130 (e.g., an HTTP GET request, or other request), which is transmitted to the proxy server 120. In some embodiments, the client device 110A is an authenticated client device. The authentication of the client device can be performed via different mechanisms.

For example, the authentication of the client device can be performed based on an authentication handshake between the proxy server 120 and the client device 110A (not illustrated in FIG. 1). The authentication handshake may include a series of messages exchanged between the client device and the proxy server 120 to authenticate the client device.

In some embodiments, the proxy server can respond to requests that the origin server would normally would not reply to, and enable authentication of the client device. For example, the client device may visit a network resource at a location that allows the creation of a unique tracking code for the client device and redirects the client device to the requested domain. For example, the client device may visit a URL such as: https://dashboard.com/create-authenticated-session?url=www.example.com. This creates a unique tracking code and redirects to the example.com domain at the URL: https://www.example.com/cdn-cgi/create-authenticated-session?sessionId=UNIQUE_SESSION_ID. The client device receives a response including a unique session identifier (e.g., the UNIQUE_SESSION_ID is set in a cookie of the response) and a redirection to the requested network resource (e.g., https://www.example.com). The client device can then transmit requests for the network resource including the unique session identifier that enables the authentication of the client device as a legitimate client device for accessing the network resource. The proxy server receives these requests and since it knows the unique session identifier that is associated with the client device, it can identify the client device 110A as being the one that was originally authenticated. In some embodiments, when the session identifier is included in a cookie the Cookie can be a short-lived cookie.

The proxy server 120 analyzes the initial request 101. The proxy server 120 retrieves the first network resource. In some embodiments, to retrieve the network resource, the proxy server 120 may transmit, at operation (2a), the request to the origin server 130 as a second request 105. The origin server 130 transmits a second response 107 to the proxy server 120. The second response 107 includes the requested network resource. The proxy server 120 receives the response 107 and analyzes it. In an alternative embodiment, the proxy server 120 may retrieve, at operation 2b, the network resource from a cache 122 without transmitting a request to the origin server 130. The proxy server 120 determines, at operation 3, a content tracker 160 for the first network resource. In some embodiments, the proxy server 120 may have access to several content trackers and the determination of the content tracker can include selecting one of the available content trackers. For example, different trackers can be used for different network resources and determining the content tracker includes the proper content tracker for the requested network resource. In some embodiments, the selection of the content tracker can be done based on the domain of the first network resource such that each domain has an associated content tracker. At operation 4, the proxy server 120 generates a first response 103 including the first network resource and the content tracker. The proxy server 120 transmits the response 103, at operation 5, to the first client device 110A.

The response 103 causes the client device 110A to transmit information 190 on additional network resources that are identified when the first network resource is interpreted (operation 6). Upon receipt of the response 103, the client device 110A interprets the first network resource (e.g., in a web application such as a web browser) to be displayed to a user of the client device 110A. The additional network resources are identified when the client device 110A requests retrieval of these resources when interpreting the first network device. The additional network resources can be identified when the client device 110A executes resources that are included inline in the code of the first network resource when the first network resource is interpreted. The information 190 on the additional network resources can include a domain name at which each additional network resource is hosted, a uniform resource locator (URL) of the additional network resource, a sample of the additional network resource. For example, the additional network resources can be any of type such as a script language files (e.g., JavaScript), style sheet language (e.g., Cascading Style Sheets (CSS)), Hypertext Markup Language (HTML) frames, web workers, fonts, images, embeddable objects such as Java applets, ActiveX, audio and video files, and other HTML5 features.

The information 190 on the additional network resources may be transmitted (operation 7a) by the first client device 110A to the service server 125. In other embodiments, the information 190 on the additional network resource(s) can be transmitted, operation 7b, to the proxy server 120. In some embodiments, the proxy server 120 may further transmit the information on the additional network resources to the service server 125. A content security policy 170 is determined based on the information 190 on the additional network resources. The determination can be performed at the service server 125 or alternatively in the proxy server 120. The content security policy 170 specifies the valid sources for the additional network resources. In some embodiments, the content security policy 170 can specify one or more domains from which the additional network resources can be retrieved. Additionally or alternatively, the content security policy 170 can specify a type of additional network resource that are allowed. For example, the content security policy 170 can specify one or more domains from which script files (e.g., JavaScript files) can be retrieved to be executed when the first network resource is interpreted. In another example, the content security policy 170 can include one or more domains from which media data (e.g., image, audio, or video) can be retrieved. The content security policy 170 can include one or more domains from which style sheets can be retrieved. The content security policy 170 can be used to determine multiple sources of other types of network resources that can be retrieved and/or executed by the client device 110A when interpreting the first network resource. In some embodiments, the content security policy can be included in an HTTP header that is to be added to the first network resource when the first network resource is requested. For example, the content security policy 170 can be included as one or more directives in a HTTP Content-Security-Policy Headers.

The content security policy is then used when a new request for the first network resource is received. For example, when the proxy server 120 receives, at operation 10, a second request 111 for the first network resource from the second client device 110B, the proxy server 120 analyzes the request and determines that a content security policy 170 is to be transmitted in the second response 113 with the first network resource. Upon receipt of the second request 111, the proxy server 120 may retrieve the first network resource by transmitting a request to the origin server 130 and receiving a response including the first network resource from the origin server 130. Alternatively, the proxy server 120 may retrieve the first network resource from the cache 122. In some embodiments, the cache 122 further includes the content security policy 170 stored with the first network resource. While FIG. 1 shows that the second request 111 originates from the second client device 110B that is separate and different from the first client device 110A, in some embodiments, the second request 111 may originate from the first client device 110A. At operation 9, the proxy server 120 generates a second response including the content security policy and the first network resource. At operation 10, the proxy server 120 transmits the second response 113 to the second client device 110B.

The content security policy 170 forces the client device 110B to retrieve and/or execute additional network resources that are identified in the content security policy 170 in order to successfully interpret and display the first network resource in the second client device 110B. If a client device that receives the content security policy 170 attempts to execute and/or retrieve a network resource that is not eligible/allowed based on the content security policy, the interpretation and display of the first network resource fails. In some embodiments, in addition to the interpretation/display of the first network resource failing, the CSP 170 may further cause the client device, e.g., client device 110B, to report information 190 on the network resource that caused the failure.

The content security policy 170 can be transmitted to one or more additional proxy servers that can be part of the cloud-based proxy service. The additional proxy servers (not illustrated) can be part of different POPs spread across multiple geographical locations. These proxy servers can be used to access the first network resource by client devices and enforce the content security policy 170. The operations of the proxy servers is similar to the operations of the proxy server 120 upon receipt of the content security policy 170.

The embodiments of the present invention allow for an automatic determination of a content security policy for a network resource. The mechanisms described herein allow the determination of the content security policy to be transparent to an owner or administrator of the origin server hosting the network resource and does not require any effort on the part of the owner/administrator. The content security policy helps mitigate attacks on the client device and the first network resource. The automatically determined CSP can help mitigate and report cross site scripting attacks and packet sniffing attacks.

A cross site scripting attacks (XSS) exploit the web application's trust of the network resources received from the origin server (through the proxy). Malicious scripts are executed by the victim's web application (running on the client device) because the web application trusts the source of the network resource. The use of the automatically generated CSP makes it possible for origin administrators/owners to reduce or eliminate the vectors by which XSS can occur without having to determine the CSP. For example, the automatically generated CSP specifies the domains that the client device should consider to be valid sources of executable scripts. The client device will then only execute scripts loaded in source files received from those whitelisted domains, ignoring all other scripts (including inline scripts and event-handling HTML attributes). The automatically generated CSP can also be generated to globally disallow script execution.

In addition to restricting the domains from which content can be loaded, the CSP can specify which protocols are allowed to be used; for example, a CSP can be automatically generated to specify that all content must be loaded using secure communication protocol (e.g., Hyper Text Transfer Protocol Secure (HTTPS)).

Thus, the mechanisms described herein allow for an automatic determination of a CSP that mitigates attacks on the client device when accessing a network resource without adding a burden on the network resource's owner to determine and set the policy. This presents significant advantages when compared to previous mechanisms in which the network resource's owner was required to determine and set the CSP.

Several mechanisms can be used to track the content of the first network resource and transmit from client device(s) information on the additional network resources that are retrieved or executed when interpreting/displaying the first network resource. In a first embodiment, the content tracker can be an initial content security policy that is set for the first network resource and is to be followed by the client device. The initial content security policy allows to obtain the information on additional network resources accessed or executed when the first network resource is interpreted. In a second embodiment, the content tracker includes code that is injected in the first network resource allowing to track the execution or retrieval of the additional network resources and the transmission of the information from the client devices.

The embodiments of FIGS. 2A-B will be described with a service server 125 that is operative to determine the content tracker, however in other embodiments, the operations performed by the service server 125 can be performed by a proxy server, e.g., proxy server 125 without departing from the scope of the present invention. While the information 190 on the additional network resources is illustrated as being received by the service server 125, in some embodiments, the information 190 is transmitted to the proxy server 120 and forwarded by the proxy server 120 to the service server 125 or alternatively used by the proxy server 120 itself to determine a CSP for the first network resource.

Receipt of Information Based on Initial Content Security Policy

Figure 2A:
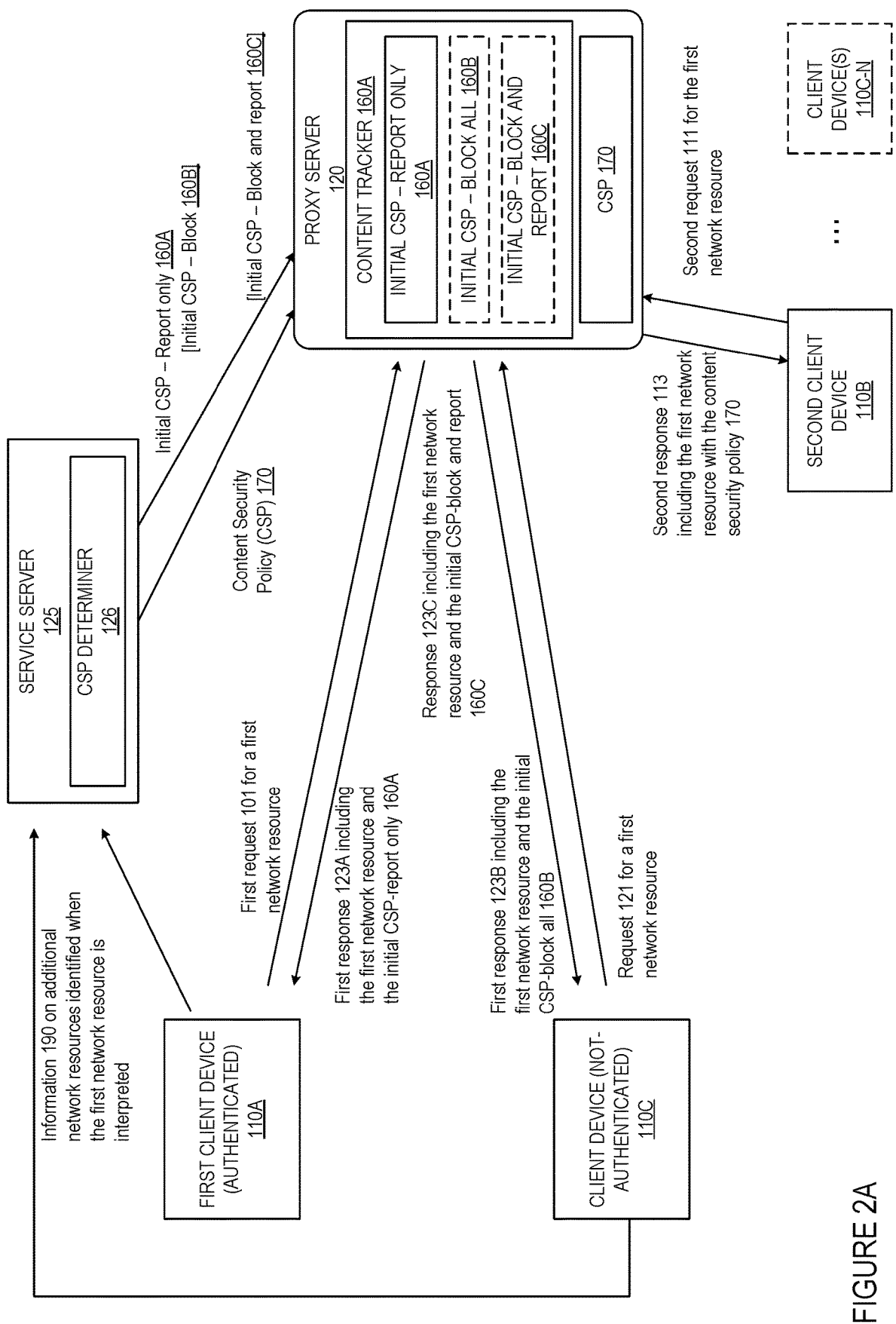
FIG. 2A illustrates a block diagram of a system in which a content security policy is automatically determined for a first network resource based on an initial content security policy transmitted to the client device, in accordance with some embodiments.

FIG. 2A illustrates a block diagram of a system in which a content security policy is automatically determined for a first network resource based on an initial content security policy transmitted to the client device, in accordance with some embodiments.

The service server 125 determines an initial CSP to be used as a content security tracker by the proxy server 120 for the first network resource. The initial CSP is transmitted to the proxy server 120. In some embodiments, initial CSP is determined directly at the proxy server 120. The initial CSP is set to obtain the information 190 on the additional network resources identified when the first network resource is interpreted. The initial CSP is a content security policy that causes the first client device 110A to report the additional network resources that are identified for the first network resource. In some embodiments, the same initial CSP can be used for multiple network resources that of multiple domains. In other embodiments, different initial CSPs can be used for the different network resources. In one example, network resources from the same domain may share the same initial CSP and network resources from different domains can have different initial CSPs.

The initial CSP includes a location at which the information 190 on additional network resources is to be transmitted. For example, the initial CSP may include a Uniform Resource Identifier (URI) that can be used by the client devices receiving the CSP to send the information 190 on the additional network resources. The URI can cause the client devices to transmit the information 190 on the additional network resources to the service server 125 or alternatively to the proxy server 120. In some embodiments, when the information 190 on the additional network resources is received at the proxy server 120 it can be transmitted to the service server 125 or alternatively stored at the proxy server 120 for determination of the CSP for the first network resource.

The initial CSP may take several forms. In one embodiment, the initial CSP can be an initial CSP-report only 160A. The service server 125 may transmit a first initial CSP-report only 160A to the proxy server 120 for the first network resource. The proxy server 120 stores a copy of the initial CSP-report only 160A. The initial CSP-report only 160A allows the service server 125 to monitor the additional network resources identified during the interpretation of the first network resource without blocking any of the network resources. Upon receipt of the first request 101 for the first network resource, the proxy server 120 retrieves the resource (not illustrated). The retrieval of the resource can be performed as described with reference to FIG. 1. The proxy server 120 generates a first response 123A that includes the first network resource and the initial CSP-report only 160A. The first response 123A is transmitted to the first client device 110A.

In some embodiments, the CSP-report only 160A may include an identification of a set of additional network resources that are allowed to be accessed by the first client device 110A and for which no information 190 is to be received from the first client device 110A. For example, the CSP-report only 160A may include a domain of a network resource from which retrieval of a given type of network resource is allowed. In these embodiments, the client device 110A is to report any additional network resource of the type indicated in the CSP-report only 160A that is not from the indicated domain. In a non-limiting example, the CSP-report only can specify a domain from which scripts can be retrieved by the first client device 110A when interpreting the first network resource. In these embodiments, the client device 110A is to report any scripts that are not at the domain indicated in the CSP-report only 160A (e.g., inline scripts, scripts from other domains, etc.). In some embodiments, the CSP-report only 160A can specify a type of additional network resources that are allowed to be retrieved. In this case the information 190 on additional network resources includes an identification of all network resources that are of a different type than the type that is allowed in the CSP-report only 160A.

In some embodiments, the CSP-report only 160A can be transmitted to authenticated client devices. In other embodiments, the CSP-report only 160A can be transmitted to authenticated and non-authenticated client devices. In a non-limiting example, the initial CSP-report only 160A can be included in an HTTP Content-Security-Policy-Report-Only response header. The HTTP CSP-Report-Only header is added by the proxy server 120 to an HTTP response that includes the first network resource when the response is generated and is transmitted to the client device 110A. The HTTP CSP-Report-Only header includes a directive that instructs the client device to report attempts to violate the CSP. The directive includes a location (e.g., URI) to which the information 190 on the additional network resources can be sent. The information 190 can be transmitted to the service server 125 (or to the proxy server 120) via an HTTP POST request of a document including an identification of the additional network resources. For example, the information can be stored in a JavaScript Object Notation (JSON) document that is transmitted via the HTTP POST request.

Other protocols and/or mechanisms can be used to transmitting the information 190 to the service server 125 or proxy server 120.

In some embodiments, when using the initial CSP-report only 160A, a service server 125 may further transmit an initial CSP-block 160B to the proxy server 120. The initial CSP-block 160B is a content security policy that is used to block additional network resources such that a client device receiving the content security policy cannot retrieve the blocked additional network resources. In some embodiments, the initial CSP-block 160B can be used to transmit a content security policy to non-authenticated client devices. In these embodiments, the proxy server is operative to transmit an initial CSP-report only 160A to authenticated network devices such as client device 110A and an initial CSP-block 160B to non-authenticated network devices such as client device 110B.

In some embodiments, the initial CSP-block 160B may include an identification of one or more network resources that are allowed to be accessed and/or executed when interpreting the first network resource in a client device. For example, the CSP-block 160B may include a domain of a network resource from which retrieval of a given type of network resource is allowed. In these embodiments, the client device 110B is to block any additional network resource of the type indicated in the CSP-block 160B that is not from the indicated domain. In a non-limiting example, the CSP-block can specify a domain from which scripts can be retrieved by the first client device 110B when interpreting the first network resource. In these embodiments, the client device 110B is to block any scripts that are not at the domain indicated in the CSP-block 160B (e.g., inline scripts, scripts from other domains, etc.). In some embodiments, the CSP-block 160B can specify a type of additional network resources that are allowed to be retrieved. In this case any other network resource identified upon interpretation of the first network resource is blocked. In some embodiments, when a network resource is blocked this may cause the interpretation and display of the first network resource to fail. In other embodiments, when a network resource is blocked this may cause the first network resource to be displayed but fail to function correctly. In a non-limiting example, an initial CSP-block can be an HTTP CSP header in which a set of zero or more additional network resources are identified. This HTTP CSP header can be considered a default CSP header that can be used in an initial phase in which all or a subset of network resources are blocked when the client device is not authenticated causing any malicious client devices or malicious network resources to not compromise the client device and/or the first network resource.

In these embodiments, the transmission of a first type of CSP to authenticated client devices, such as initial CSP-report only 160A to client device 110A, and a second type of CSP to non-authenticated client devices, such as initial CSP-block 160B to client device 110C, causes the service server 125 to receive information 190 on the additional network resources needed to interpret and display a first network resource from legitimate client devices (authenticated) and block the execution of any additional network resource in client devices that are not authenticated.

In a second embodiment, the initial CSP can be an initial CSP-block and report 160C. In this embodiment, instead of transmitting an initial CSP-report only 160A or an initial CSP-report only 160A and an initial CSP-block 160B, the service server 125 transmits an initial CSP-block and report 160B to the proxy server 120. The proxy server 120 stores the initial CSP-block and report 160C and upon receipt of a request from client device, e.g., client device 110A, for the first network resource, the proxy server generates a response 123C including the first network resource and the initial CSP-block and report 160C. The proxy server 120 transmits the response 123C including the first network resource and the initial CSP-block and report 160C to the client device 110A. The initial CSP-block and report includes a directive that indicates a location at which information 190 regarding any additional network resources that violate the CSP is to be transmitted. In some embodiments, the content security policy initial CSP-block and report 160C may include a set of one or more directives that indicate the additional network resources that a client device receiving the policy can access/execute when interpreting the first network resource. Thus, the initial CSP-block and report 160C is a default policy that blocks any network resources that are not indicated in the policy and causes the client device to report information 190 on additional network resources identified when the first network resource is interpreted. For example, the CSP-report and block 160C can be transmitted to the authenticated client device 110A and/or the non-authenticated client device 110C and causes each one of the client devices to report any additional network resources accessed/executed when interpreting the first network resource that are included in a directive of allowed resources in the CSP 160C. In a non-limiting example, the initial CSP-block and report 160C can be included in an HTTP CSP header including a directive to allow no network resource (e.g., HTTP CSP header with default-src 'none') and a location for reporting the violation of this policy (e.g., report uri/csp-violations or report-to/csp-violations). The directive to allow no network resource causes the client device to report any network resources that is accessed or executed when the first network resource is interpreted/displayed on the client device. In some embodiments, the initial CSP-block and report is transmitted uniquely to authenticated client devices, e.g., client device 110A.

In the different embodiments, the initial CSP is set by a service server 125 such that an authenticated client device reports additional network resources that are accessed/executed by the client device when interpreting the first network resource. The initial CSP can be set such that all of the additional network resources needed for the first network resource are reported. For example, when the initial CSP is an initial CSP report-only 160A, no allowed network resource is set in the initial CSP-report only causing any network resource executed or retrieved for the first network resource to be reported to the service server 125. In another example, when the initial CSP is an initial CSP-block and report 160C, no allowed network resource is set causing all network resources to be blocked and reported to the service server 125 for the first network resource. Alternatively, the service server 125 may have knowledge of one or more resources that are needed for the first network resource and the initial CSP can be set such that only additional network resources different from the known network resources are reported. For example, when the initial CSP is an initial CSP report only 160A, the initial CSP report only can include a domain name or a location/type of a network resource that is allowed to be accessed for the first network resource, this causes the client device receiving the initial CSP report only 160A to report the network resources that are different from the allowed network resource to the service server 125. In another example, when the initial CSP is an initial CSP-block and report 160C, the initial CSP block and report can include a domain name or a location/type of a network resource that is allowed to be accessed for the first network resource, causing the client device receiving the initial CSP block and report 160C to block and report the network resources that are different from the allowed network resource to the service server 125.

In some embodiments, the initial CSP is used in an initial stage that allows the service server 125 to learn which network resources are needed to interpret and display the first network resource. In some embodiments, the initial CSP can be used at a later stage to determine an updated CSP for a first network resource even if a CSP was already used for the first network resource.

Figure 2B:
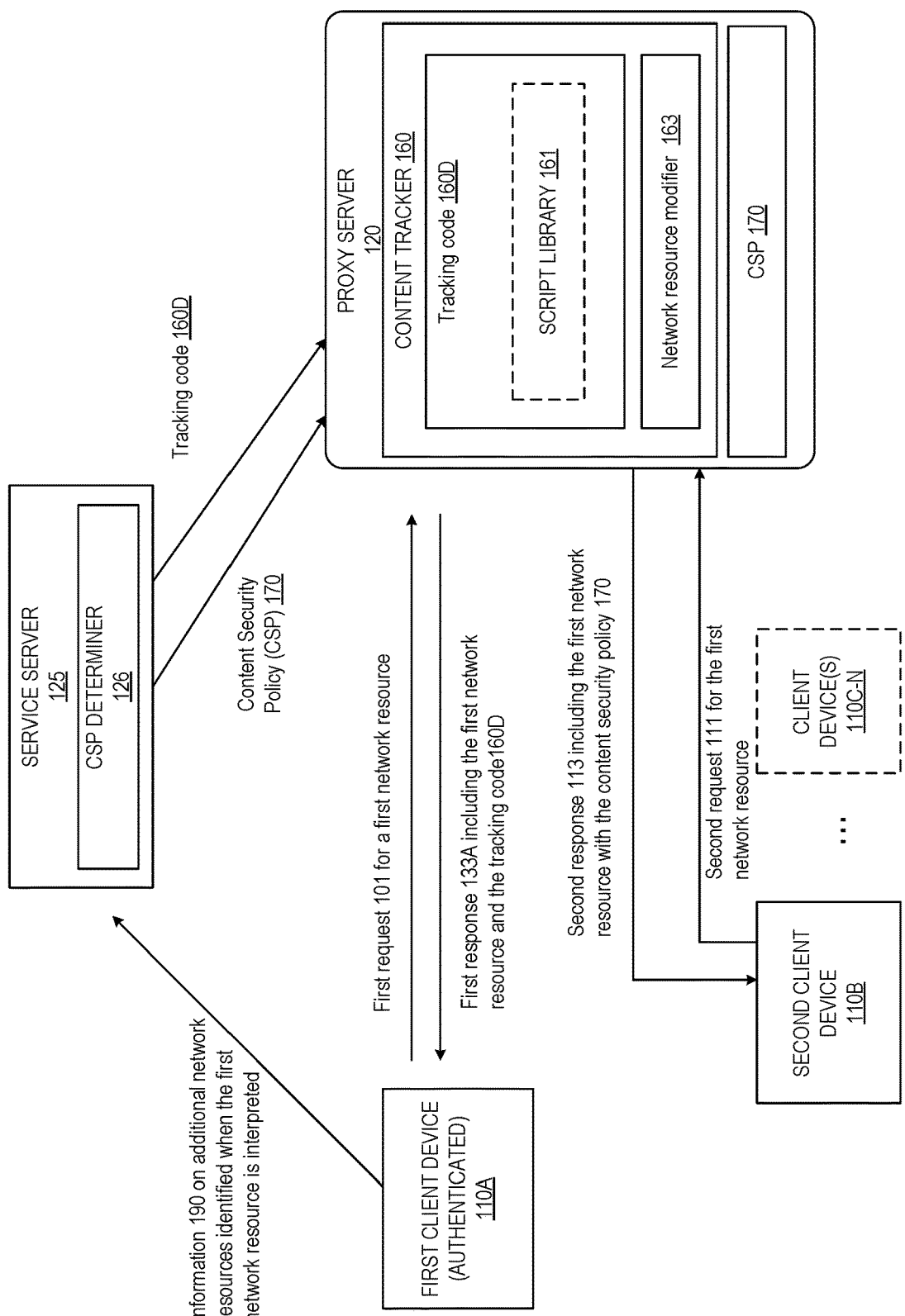
FIG. 2B illustrates a block diagram of a system in which a content security policy is automatically determined based on a code injected into the first network resource, in accordance with some embodiments.

Receipt of Information Based on Tracking Code Injected in the First Network Resource FIG. 2B illustrates a block diagram of a system in which a content security policy is automatically determined based on a code injected into the first network resource, in accordance with some embodiments. FIG. 2B describes a second embodiment, in which the content tracker 160 includes codes that is injected in the first network resource allowing to track the execution or retrieval of the additional network resources and the transmission of the information from the client devices.

In the illustrated embodiment, the service server 125 transmits tracking code 160D to the proxy server 120. In some embodiments, the tracking code can be determined/stored at the proxy server 120 and is not transmitted from the service server 120. Upon receipt of the first request 101 for the first network resource, the proxy server 120 generates the first response 133A including the first network resource and the tracking code 160D. The tracking code 160D is executed when the first network resource is interpreted at the first client device 110A and causes the client device to transmit the information 190 on the additional network resources. For example, a script library (e.g., JavaScript library) can be inserted into the first network resource by the service server 125. The script library can inspect a document object model of the first network resource and post information about the scripts to the service server 125.

The tracking code 160D may include a location at which an identification of the additional network resources can be transmitted. For example, the tracking code 160D may include a Uniform Resource Identifier (URI) that can be used by the client devices receiving the tracking code 160D to send the information 190 on the additional network resources. The URI can cause the client devices to transmit the information 190 on the additional network resources to the service server 125 or alternatively to the proxy server 120. In some embodiments, when the information 190 on the additional network resources is received at the proxy server 120 it can be transmitted to the service server 125 or alternatively stored at the proxy server 120 for determination of the CSP for the first network resource.

The proxy server 120 includes a network resource modifier 163. The network resource modifier 163 is operative to modify the network resource to include the tracking code 169D. The modified network resource is then included in the first response 133A, generated by the proxy server 120. In some embodiments, the network resource modifier 163 may further detect inline code (e.g., script, CSS, etc.), extract the inline code to be stored in an external file, store the file in a location that is accessible to the proxy server 120, replace the inline code in the first network resource with the location at which the external file is stored, causing the client device to have to request the external file in order to complete interpretation of the first network resource instead of simply executing the inline code. This allows a more efficient and better tracking of the code previously present as an inline version in the first network resource.

The tracking code 160D allows the service server 125 to obtain information 190 on the additional network resources that are identified when the first network resource is interpreted and displayed in the first client device 110A. In some embodiments, the tracking code 160D is only transmitted to authenticated client devices such that the information 190 obtained is indicative of legitimate additional network resources needed to interpret and display the first network resource. In other embodiments, the tracking code 160D can be transmitted to authenticated and non-authenticated client devices. In these embodiments, the information received from the client devices may need to be further analyzed to determine which network resources are legitimate and which are not.

Determination of Content Security Policy Based on Information of Additional Network Resources As a result of the content tracker 160 (which can be an initial CSP 160A or 160C, or tracking code 160D), the service server 125 receives the information 190 on additional network resources from one or more client devices. The information 190 on additional network resources may include one or more of the following parameters: 1) an identification of the additional network resource requested/executed by the client device when interpreting the first network resource; and 2) the identification of the first network resource for which the additional network resource is needed. The information 190 can include additional optional information 190 such as the type of content tracker that caused the transmission of the information 190 (e.g., initial CSP report-only or block and report, tracking code); original-policy specified in the initial CSP (when the initial CSP includes an original policy); a referrer of the first network resource; a sample of an inline script, event handler, or style that caused the reporting; a name of the policy section that was violated.

In one non-limiting example, when the content tracker is an initial CSP, the information 190 on additional network resources can be reported to the service server 125 in JSON documents sent via an HTTP POST request to a specified URI. The specified location (e.g., URI) can be included in the response that includes the content tracker. The JSON document may contain some of the following data for each first network resource 1) blocked-uri (the URI of the resource that was blocked from loading by the content security policy). In some embodiments, when the blocked URI is from a different origin than the first network resource, then the blocked URI can be truncated to contain just the scheme, host, and port. The JSON document may include 2) the type of initial CSP (e.g., disposition), which can be either "enforce" or "reporting" depending on whether the initial CSP was CSP header or a CSP-Report-Only header. The JSON document may also include 3) the URI of the first network resource (e.g., document-uri) indicating the URI of the network resource in which the violation occurred. The JSON document may also include 4) effective-directive indicating the directive whose enforcement caused the violation. The JSON document may also include 5) the original-policy indicating the original policy as specified by a Content-Security-Policy-Report-Only HTTP header. The JSON document may also include 6) a referrer indicating the referrer of the first network resource in which the violation occurred. The JSON document may also include 7) a script-sample indicating a set of first characters of the inline script, event handler, or style that caused the violation. The JSON document may also include 8) a status-code indicating an HTTP status code of the resource on which the global object was instantiated. The JSON document may also include 8) a violated-directive indicating the name of the policy section that was violated. One or more of these parameters can be included for each violation that occurs when the client device (e.g., 110A, 110B) interpret the first network resource and has received an initial CSP. The type of parameters included in the information on additional network resources can depend on the type of the initial CSP and the type of violation that occurs.

In some embodiments, when the content tracker 160 is tracking code 160D, the information 190 is reported to the service server as a JSON object containing information about the network resource loaded, including the URL of the network resource, and the HTML of the tag that caused the network resource to be fetched.

The service server 125 uses the information 190 received from the client devices to determine a new CSP 170 for the network resource. The content security policy 170 identifies secure sources and or types of additional network resources that the client device 110B can access (e.g., retrieve from the identified source and/or execute) when interpreting and displaying the first network resource in the second client device 110B. If a client device that receives the content security policy 170 attempts to execute and/or retrieve a network resource that is not eligible/allowed based on the content security policy, the interpretation and display of the first network resource fails. In some embodiments, in addition to the interpretation/display of the first network resource failing, the CSP 170 may further cause the client device, e.g., client device 110B, to report information on the network resource that caused the failure.

In one embodiment, the new CSP 170 can include an indication of one or more additional network resources that can be securely accessed when interpreting and displaying the first network resource. For example, the new CSP 170 can include domain names from which network resources are allowed to be retrieved. In other words, the new CSP 170 includes a whitelist of domains from which network resources can be retrieved for the first network resource. In other examples, the new CSP 170 can include a type of resources that are allowed to be accessed. For example, the CSP 170 may indicate that only images can be loaded for the first network resource causing any other types of media content (such as video content, audio content) to be blocked when interpreting the first network resource. Other examples of network resources can be allowed without departing from the scope of the present invention (e.g., JavaScript, CSS, HTML frames, etc.).

The service server 125 determines the new CSP 170 based on the information 190 received from the client devices. In some embodiments, the service server 125 may determine the new CSP 170 from feedback received from one or more authenticated client devices. In some embodiments, the service server 125 may determine the content security policy based on feedback received from a large number of unauthenticated clients. In some embodiments, when the content tracker is transmitted only to client devices that are authenticated, the information 190 on the additional network resource indicates only sources and types of additional network resources that are legitimate and can be accessed by a client device when interpreting the first network resource. In this case, the service server 125 determines that the CSP is set to allow access to all the sources and types of the additional network resources identified by the information 190. In some embodiments, the information 190 includes the locations of the sources of the additional network resource.

For example, the information 190 may include one or more domain names from which the network resources can be accessed (e.g., domains names of JavaScript libraries or code, of CSS code, of media content such as images, videos, and audio, fonts, HTTP frames, etc.). In these embodiments, the service server 125 may set the CSP to allow access of network resource from all of these domains. In some embodiments, the information 190 may include an indication of a type of network resources that is legitimate and can be accessed by the client devices when interpreting the first network resource. As a consequence, the information 190 can be used to restrict the types of resources that are allowed to be accessed by a client device when interpreting the first network resource. For example, the service server 125 may determine based on the information 190 that one or more types of network resources are never accessed (e.g., one of images, video content, frames, scripts, etc.) and may include in the CSP that the client device is not to access this type of resources when interpreting the first network resource.

In other embodiments, the service server 125 may determine the new CSP 170 based on information 190 received from authenticated client devices and non-authenticated client devices. Once the CSP is automatically determined based on the information 190, the CSP can be used to generate a CSP header (e.g., an HTTP CSP header). One or more directives for the CSP header are set based on the CSP. The CSP header is then transmitted from the proxy server 120 to the client device 110A in a response including the first network resource. For example, when the proxy server 120 receives a second request for the network resource from client device 110B, the proxy server 120 transmits the second response to the client device 110B including the CSP and the first network resource.

Multiple directives can be used to implement a content security policy with a CSP header. The server (proxy server 120 or the service server 125) may determine one or more of the following directives: 1) a loading directive (e.g., default-src for HTTP CSP header) that defines a loading policy for all resources type in case a resource type dedicated directive is not defined; 2) a script directive (e.g., script-src for HTTP CSP header) that defines which scripts the first network resource can execute; 3) a plugin directive (e.g., object-src for HTTP CSP header) that defines from where the first network resource can load plugins; 4) a style directive (e.g., style-src for HTTP CSP header) that defines which styles (CSS) the user applies to the first network resource; 5) an image directive (e.g., img-src for HTTP CSP header) that defines from where the first network resource can load images; 5) a media directive (e.g., media-src for HTTP CSP header) that defines from where the first network resource can load video and audio; 6) a frames directive (e.g., frame-src for HTTP CSP header) that defines from where the first network resource can embed frames; 7) a frame ancestor directive (e.g., frame-ancestors for HTTP CSP header) that specifies valid parents that may embed a page using <frame>, <iframe>, <object>, <embed>, or <applet>; 8) a fonts directive (e.g., font-src for HTTP CSP header) defines from where the first network resource can load fonts; 9) a connect directive (e.g., connect-src for HTTP CSP header) that defines which URIs the first network resource can load using script interfaces; 10) an action directive (e.g., form-action for HTTP CSP header) that defines which URIs can be used as the action of HTML form elements; 11) a sandbox directive (e.g., sandbox for HTTP CSP header) that specifies an HTML sandbox policy that the client device applies to the first network resource; 12) a script execution directive (e.g., script-nonce for HTTP CSP header) that defines script execution by requiring the presence of the specified nonce on script elements; a report directive (e.g., report-uri for HTTP CSP header) that specifies a URI to which the user agent sends reports about policy violation. In some embodiments, the CSP can include one or multiple of these directives indicating a type or location of a network resource that can be accessed by the client device when executing the first network resource. Multiple other directives can be used to implement the CSP and cause the client device to enforce the content security policy.

In some embodiments, the CSP is transmitted as the CSP header (e.g., HTTP CSP header) with the one or more directives. In some embodiments, the service server 125 may generate the CSP header that includes the one or more directives. In other embodiments, the CSP is transmitted to the proxy server 120 and the proxy server 120 is operative to generate the CSP header based on the CSP received from the service server 125. For example, the CSP can be transmitted by the service server 125 to the proxy server 120 as a JSON file including an identification of the first network resource (e.g., domain name) and the one or more directives set for the first network resource. In the embodiment where the proxy server 120 determines the CSP instead of the service server 125, the proxy server 120 is also operative to generate the CSP header from the CSP and transmit the CSP header with a response for the first network resource.

The embodiments described herein allow for an automatic determination of a content security policy for a network resource. The automatic determination of the content security policy is transparent to an owner or administrator of the origin server hosting the network resource and does not require any effort on the part of the owner/administrator. The content security policy helps mitigate attacks on the client device and the network resource. The automatically determined CSP can mitigate and report cross site scripting attacks and packet sniffing attacks.

The operations in the flow diagrams below will be described with reference to the exemplary embodiments of the FIG. 1 and FIGS. 2A-B. However, it should be understood that the operations of the flow diagrams can be performed by embodiments of the invention other than those discussed with reference to these figures, and the embodiments of the invention discussed with reference to FIG. 1 and FIGS. 2A-B can perform operations different than those discussed with reference to the flow diagrams.

FIG. 3 illustrates a flow diagram of exemplary operations that can be performed for determination of a content tracker, in accordance with some embodiments. The operation of FIG. 3 can be performed by a server of the cloud-based proxy service. For example, the server can be the proxy server 120 or alternatively the service server 125. At operation 302, the server determines a content tracker for the first network resource. The content tracker is to be transmitted to a client device with the first network resource in response to a request received from the client device for the first network resource. The content tracker is to be used to track the content of the first network resource when the first network resource is interpreted at the client device. In some embodiments, the content tracker includes a location at which the information on the additional network resources is to be transmitted by the first client device. For example, the content tracker may include a URI to which the information is to be transmitted. The URI can point to a location in the proxy server 120 or alternatively to a location in the service server 125.

Several mechanisms can be used to track the content of the first network resource and to cause the client device 110A to report information on the additional network resources that are identified when interpreting/displaying the first network resource. In a first embodiment, the flow of operations includes operation 302, where the content tracker is an initial content security policy that is to be enforced by the client device when the client device interprets the first network resource. The initial content security policy allows to obtain the information on additional network resources accessed or executed when the first network resource is interpreted. FIG. 2A illustrates an exemplary embodiment, in which the content tracker 160 is an initial content security policy. In some embodiments, the initial content security policy may cause, operation 306, the first client device to report the one or more additional network resources accessed by the first client device when the first client device interprets the first network resource, and the initial content security policy does not cause the first client device to block the one or more additional network resources. In other embodiments, the initial content security policy may cause, operation 308, the first client device to report and block the one or more additional network resources accessed by the first client device when the first client device interprets the first network resource.

In a second embodiment, the content tracker (operation 310) includes code that is injected in the first network resource to track the additional network resources that are accessed when the client device interprets the first network resource. The execution of the code causes transmission of the information 190 on the additional network resources from the client device 110A. FIG. 2B illustrates an exemplary embodiment, in which the content tracker 160 is code that is injected in the first network resource and which causes tracking of the additional network resources and the transmission of the information from the client devices.

In some embodiments, when the server determining the content tracker is the service server 125, the flow can move to operation 312, at which the service server 125 transmits the content tracker to one or more proxy servers of the cloud-based proxy service. The proxy servers are to receive requests for the first network resource on behalf of the origin server 130 that hosts the first network resource.

Figure 4:
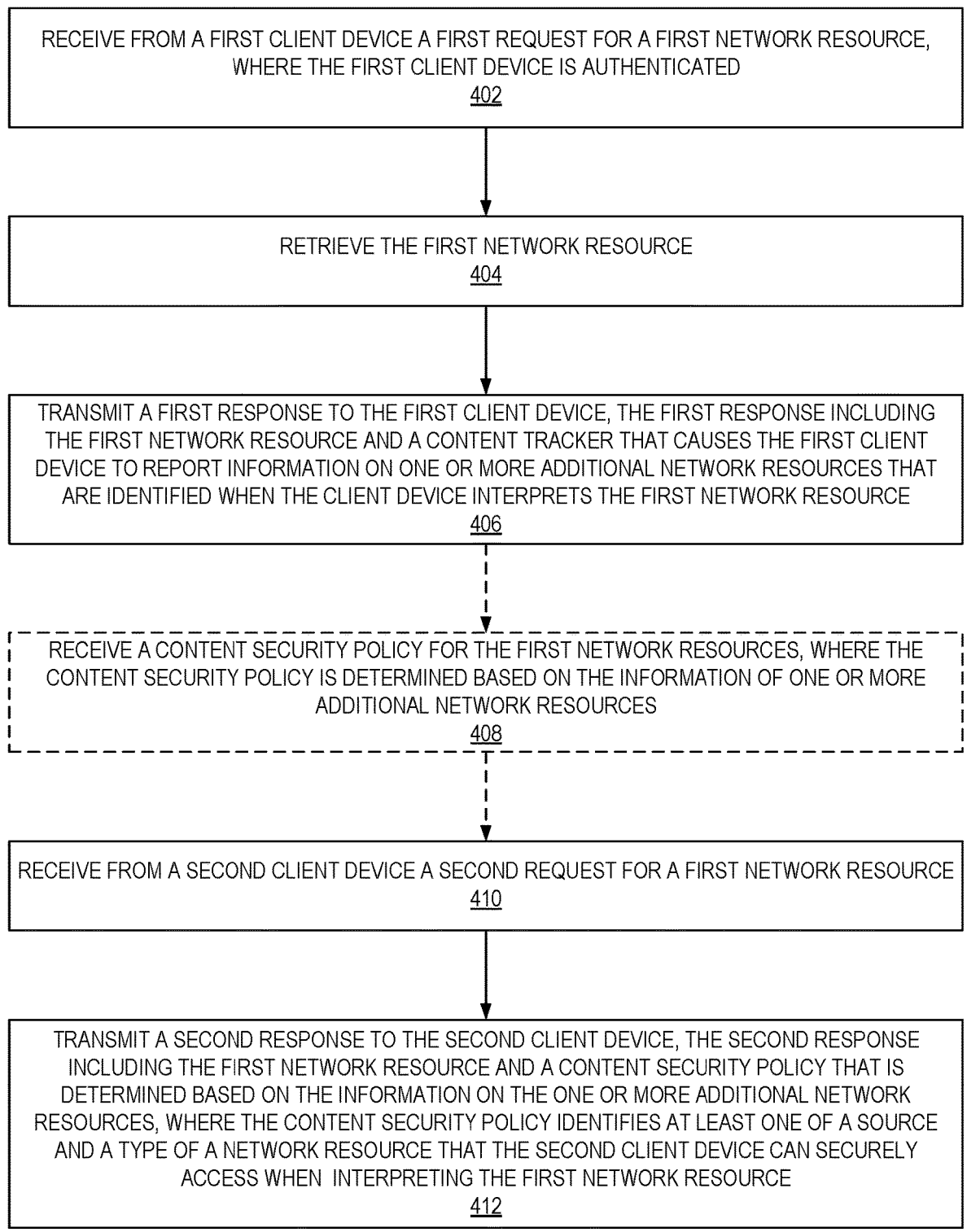
FIG. 4 illustrates a flow diagram of exemplary operations that can be performed for automatic determination of a content security policy, in accordance with some embodiments.

FIG. 4 illustrates a flow diagram of exemplary operations that can be performed for automatic determination of a content security policy, in accordance with some embodiments. The operations of FIG. 4 can be performed in a proxy server of a cloud-based proxy service. At operation 402, the proxy server 120 receives from a first client device (e.g., client device 110A) a first request for a first network resource. The first client device 110A is authenticated. Authentication of the first client device can be performed via one of several mechanisms. For example, authentication can be performed through authentication handshake mechanism between the first client device 110A and the proxy server 120.

The flow then moves to operation 404, at which, the proxy server 120 retrieves the first network resource. For example, the proxy server 120 may receive a first request 101 for a network resource and may transmit the request 103 (e.g., an HTTP GET request) for the network resource to the origin server 130. The origin server 130 may transmit a response 107 (e.g., an HTTP response) with the requested resource to the proxy server 120. The proxy server 120 may analyze the incoming traffic including the response 107 and take one or more actions, including, for example, transmitting a response to the requesting client device 110A. The proxy server 120 may determine a content tracker for the first network resource included in the response 107 and may generate a first response 103 including the content tracker and the first network resource. In some embodiments, the proxy server 120 may also cache resources for the domains and respond to requests from client devices locally if the requested resource is in cache (e.g., stored in cache 122). For example, when the proxy server 120 receives the first request 101, instead of transmitting the request 105 and receiving the response 107, the proxy server may retrieve the first network resource from the cache 122. The proxy server 120 then generates the first response 103 with the content tracker and the first network resource. When the first response 103 is generated, the proxy server 120 transmits it to the client device 110A.

At operation 406, the proxy server 120 transmits a first response to the first client device 110A, the first response 103 including the first network resource and a content tracker 160. The content tracker 160 causes the client device 110A to report information 190 on one or more additional network resources that are identified when the first client device 110A interprets the first network resource.

Figure 5:
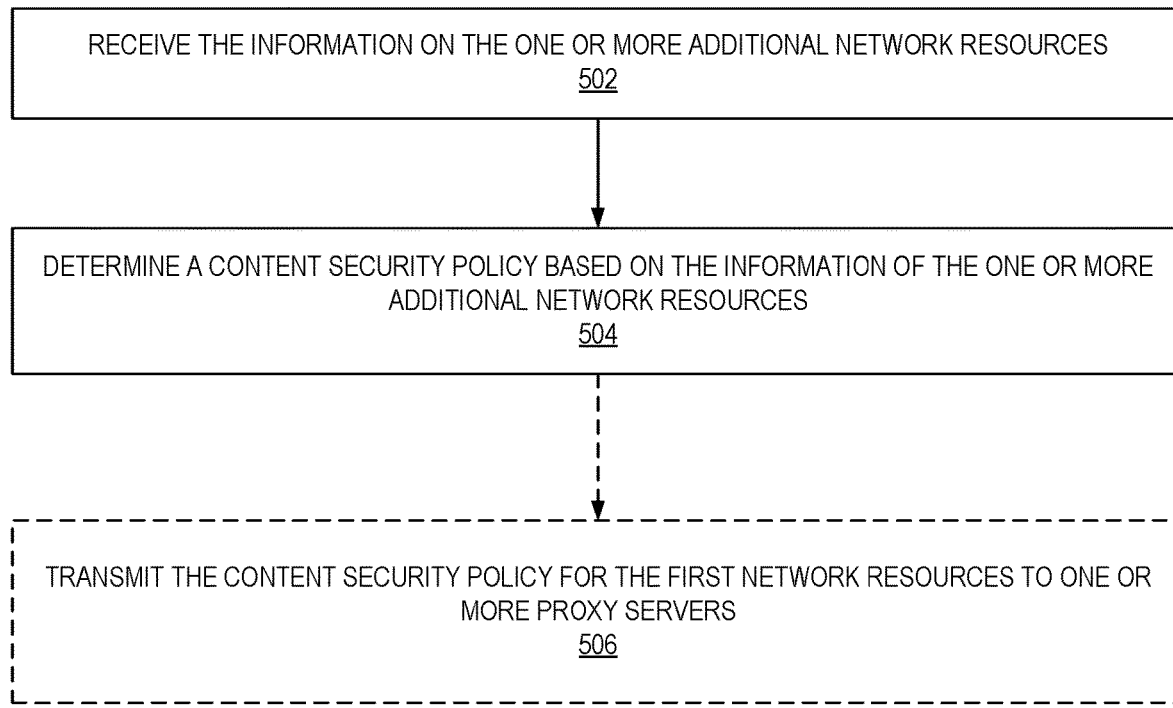
FIG. 5 illustrates a flow diagram of exemplary operations for determining a content security policy based on reports from client device(s), in accordance with some embodiments.

In some embodiments, the proxy server 120 is operative to perform the operations of FIG. 5 and operation 408 is skipped. In other embodiments, the proxy server 120 is operative to perform operation 408 and the operations of FIG. 5 are performed by another server of the cloud-based proxy service such as service server 125. At operation 408, the proxy server receives a content security policy for the first network resource, where the content security policy is determined based on the information 190 on the additional network resources.

At operation 410, the proxy server 120 receives, from a second client device 110B, a second request 111 for the first network resource. The proxy server 120 transmits a second response 113 to the second client device 110B. The second response 113 includes the first network resource and a content security policy that is determined based on the information on the one or more additional network resources. The content security policy identifies at least one of a source and a type of a network resource that the second client device can securely access when interpreting the first network resource.

FIG. 5 illustrates a flow diagram of exemplary operations for determining a content security policy based on reports from client device(s), in accordance with some embodiments. The operations of FIG. 5 can be performed by a proxy server 120 or another server of the cloud-based proxy service such as the service server 125.

At operation 502, the server (e.g., proxy server 120 or service server 125) receives the information 190 on one or more additional network resources from the client device 110A. The server receives the information 190 as a result of the transmission of the content tracker 160 to the client device 110A and interpretation of the first network resource at the client device. For example, an additional network resources can be identified when the first client device 110A transmits a request for an additional network resource or executes the additional network resource when interpreting the first network resource.

The information 190 on the additional network resources may include one or more of the following parameters: 1) an identification of the additional network resource requested/executed by the client device when interpreting the first network resource; and 2) the identification of the first network resource for which the additional network resource is needed. In some embodiments, the identification of the additional network resource can be a domain name of the network resource. The information 190 can include additional optional information 190 such as the type of content tracker that caused the transmission of the information 190 (e.g., initial CSP report-only or block and report, tracking code); original-policy specified in the initial CSP (when the initial CSP includes an original policy); a referrer of the first network resource; a sample of an inline script, event handler, or style that caused the reporting; a name of the policy section that was violated.

In one non-limiting example, when the content tracker is an initial CSP, the information 190 on additional network resources can be reported to the server in JSON documents sent via HTTP POST requests to a specified URI. The specified location (e.g., URI) can be included in the response that includes the content tracker. The JSON document may contain some of the following data for each first network resource 1) blocked-uri (the URI of the resource that was blocked from loading by the content security policy). In some embodiments, when the blocked URI is from a different origin than the first network resource, then the blocked URI can be truncated to contain just the scheme, host, and port. The JSON document may include 2) the type of initial CSP (e.g., disposition), which can be either "enforce" or "reporting" depending on whether the initial CSP was CSP header or a CSP-Report-Only header. The JSON document may also include 3) the URI of the first network resource (e.g., document-uri) indicating the URI of the network resource in which the violation occurred. The JSON document may also include 4) effective-directive indicating the directive whose enforcement caused the violation. The JSON document may also include 5) the original-policy indicating the original policy as specified by a Content-Security-Policy-Report-Only HTTP header. The JSON document may also include 6) a referrer indicating the referrer of the first network resource in which the violation occurred. The JSON document may also include 7) a script-sample indicating a set of first characters of the inline script, event handler, or style that caused the violation. The JSON document may also include 8) a status-code indicating an HTTP status code of the resource on which the global object was instantiated. The JSON document may also include 8) a violated-directive indicating the name of the policy section that was violated. One or more of these parameters can be included for each violation that occurs when the client device (e.g., 110A, 110B) interprets the first network resource and has received an initial CSP. The type of parameters included in the information on additional network resources can depend on the type of the initial CSP and the type of violation that occurs.

In some embodiments, when the content tracker 160 is tracking code 160D, the information 190 is reported to the service server as a JSON object containing information about the network resource loaded, including the URL of the network resource, and the HTML of the tag that caused the network resource to be fetched.

The flow then moves to operation 504, at which the server 120 determines based on the information 190 on the additional network resources a content security policy for the first network resource. In some embodiments, the service server 125 may determine the new CSP 170 from feedback received from one or more authenticated client devices. In some embodiments, the service server 125 may determine the content security policy based on feedback received from a large number of unauthenticated clients. The server uses the information 190 received from the client device(s) to determine a new CSP 170 for the first network resource. The content security policy 170 identifies secure sources and or types of additional network resources that the client device (s) can access (e.g., retrieve from the identified source and/or execute) when interpreting and displaying the first network resource. If a client device that receives the content security policy 170 attempts to execute and/or retrieve a network resource that is not eligible/allowed based on the content security policy, the interpretation and display of the first network resource fails. In some embodiments, in addition to the interpretation/display of the first network resource failing, the CSP 170 may further cause the client device, e.g., client device 110B, to report information 190 on the network resource that caused the failure.

In one embodiment, the new CSP 170 can include an indication of one or more additional network resources that can be securely accessed when interpreting and displaying the first network resource. For example, the new CSP 170 can include domain names from which network resources are allowed to be retrieved. In other words, the new CSP 170 includes a whitelist of domains from which network resources can be retrieved for the first network resource. In other examples, the new CSP 170 can include a type of resources that are allowed to be accessed. For example, the CSP 170 may indicate that only images can be loaded for the first network resource causing any other types of media content (such as video content, audio content) to be blocked when interpreting the first network resource. Other examples of network resources can be allowed without departing from the scope of the present invention (e.g., JavaScript, CSS, HTML frames, etc.).

In some embodiments, when the content tracker is transmitted only to client devices that are authenticated, the information 190 on the additional network resource indicates only sources and types of additional network resources that are legitimate and can be accessed by a client device when interpreting the first network resource. In this case, the server sets the CSP to allow access to all the sources and types of the additional network resources identified by the information 190. In some embodiments, the information 190 includes the locations of the sources of the additional network resource. For example, the information 190 may include one or more domain names from which the network resources can be accessed (e.g., domains names of JavaScript libraries or code, of CSS code, of media content such as images, videos, and audio, fonts, HTTP frames, etc.). In these embodiments, the service server 125 may set the CSP to allow access of network resource from all of these domains. In some embodiments, the information 190 may include an indication of a type of network resources that is legitimate and can be accessed by the client devices when interpreting the first network resource. As a consequence, the information 190 can be used to restrict the types of resources that are allowed to be accessed by a client device when interpreting the first network resource. For example, the service server 125 may determine based on the information 190 that one or more types of network resources are never accessed (e.g., one of images, video content, frames, scripts, etc.) and may include in the CSP that the client device is not to access this type of resources when interpreting the first network resource.

In other embodiments, the service server 125 may determine the new CSP 170 based on information 190 received from authenticated client devices and non-authenticated client devices. Once the CSP is automatically determined based on the information 190, the CSP can be used to generate a CSP header (e.g., an HTTP CSP header). One or more directives for the CSP header are set based on the CSP. The CSP header is then transmitted from the proxy server 120 to the client device 110A in a response including the first network resource. For example, when the proxy server 120 receives a second request for the network resource from client device 110B, the proxy server 120 transmits the second response to the client device 110B including the CSP and the first network resource.

Multiple directives can be used to implement a content security policy with a CSP header. The server (proxy server 120 or the service server 125) may determine one or more of the following directives: 1) a loading directive (e.g., default-src for HTTP CSP header) that defines a loading policy for all resources type in case a resource type dedicated directive is not defined; 2) a script directive (e.g., script-src for HTTP CSP header) that defines which scripts the first network resource can execute; 3) a plugin directive (e.g., object-src for HTTP CSP header) that defines from where the first network resource can load plugins; 4) a style directive (e.g., style-src for HTTP CSP header) that defines which styles (CSS) the user applies to the first network resource; 5) an image directive (e.g., img-src for HTTP CSP header) that defines from where the first network resource can load images; 5) a media directive (e.g., media-src for HTTP CSP header) that defines from where the first network resource can load video and audio; 6) a frames directive (e.g., frame-src for HTTP CSP header) that defines from where the first network resource can embed frames; 7) a frame ancestor directive (e.g., frame-ancestors for HTTP CSP header) that specifies valid parents that may embed a page using <frame>, <iframe>, <object>, <embed>, or <applet>; 8) a fonts directive (e.g., font-src for HTTP CSP header) defines from where the first network resource can load fonts; 9) a connect directive (e.g., connect-src for HTTP CSP header) that defines which URIs the first network resource can load using script interfaces; 10) an action directive (e.g., form-action for HTTP CSP header) that defines which URIs can be used as the action of HTML form elements; 11) a sandbox directive (e.g., sandbox for HTTP CSP header) that specifies an HTML sandbox policy that the client device applies to the first network resource; 12) a script execution directive (e.g., script-nonce for HTTP CSP header) that defines script execution by requiring the presence of the specified nonce on script elements; a report directive (e.g., report-uri for HTTP CSP header) that specifies a URI to which the user agent sends reports about policy violation. In some embodiments, the CSP can include one or multiple of these directives indicating a type or location of a network resource that can be accessed by the client device when executing the first network resource. Multiple other directives can be used to implement the CSP and cause the client device to enforce the content security policy.

In some embodiments, the CSP is transmitted as the CSP header (e.g., HTTP CSP header) with the one or more directives. In some embodiments, the service server 125 may generate the CSP header that includes the one or more directives. In other embodiments, the CSP is transmitted to the proxy server 120 and the proxy server 120 is operative to generate the CSP header based on the CSP received from the service server 125. For example, the CSP can be transmitted by the service server 125 to the proxy server 120 as a JSON file including an identification of the first network resource (e.g., domain name) and the one or more directives set for the first network resource. In the embodiment where the proxy server 120 determines the CSP instead of the service server 125, the proxy server 120 is also operative to generate the CSP header from the CSP and transmit the CSP header with a response for the first network resource.

In some embodiments, when the server is the service server 125, the server may further transmit, at operation 506, the content security policy for the first network resource to the proxy server 120. The server may further transmit the content security policy for the first network resource to other proxy servers (e.g., located in other POPs) of the cloud-based proxy service.

The embodiments described herein allow for an automatic determination of a content security policy for a network resource. The automatic determination of the content security policy is transparent to an owner or administrator of the origin server hosting the network resource and does not require any effort on the part of the owner/administrator. The content security policy helps mitigate attacks on the client device and the network resource. The automatically determined CSP can mitigate and report cross site scripting attacks and packet sniffing attacks.

Architecture

Figure 6:
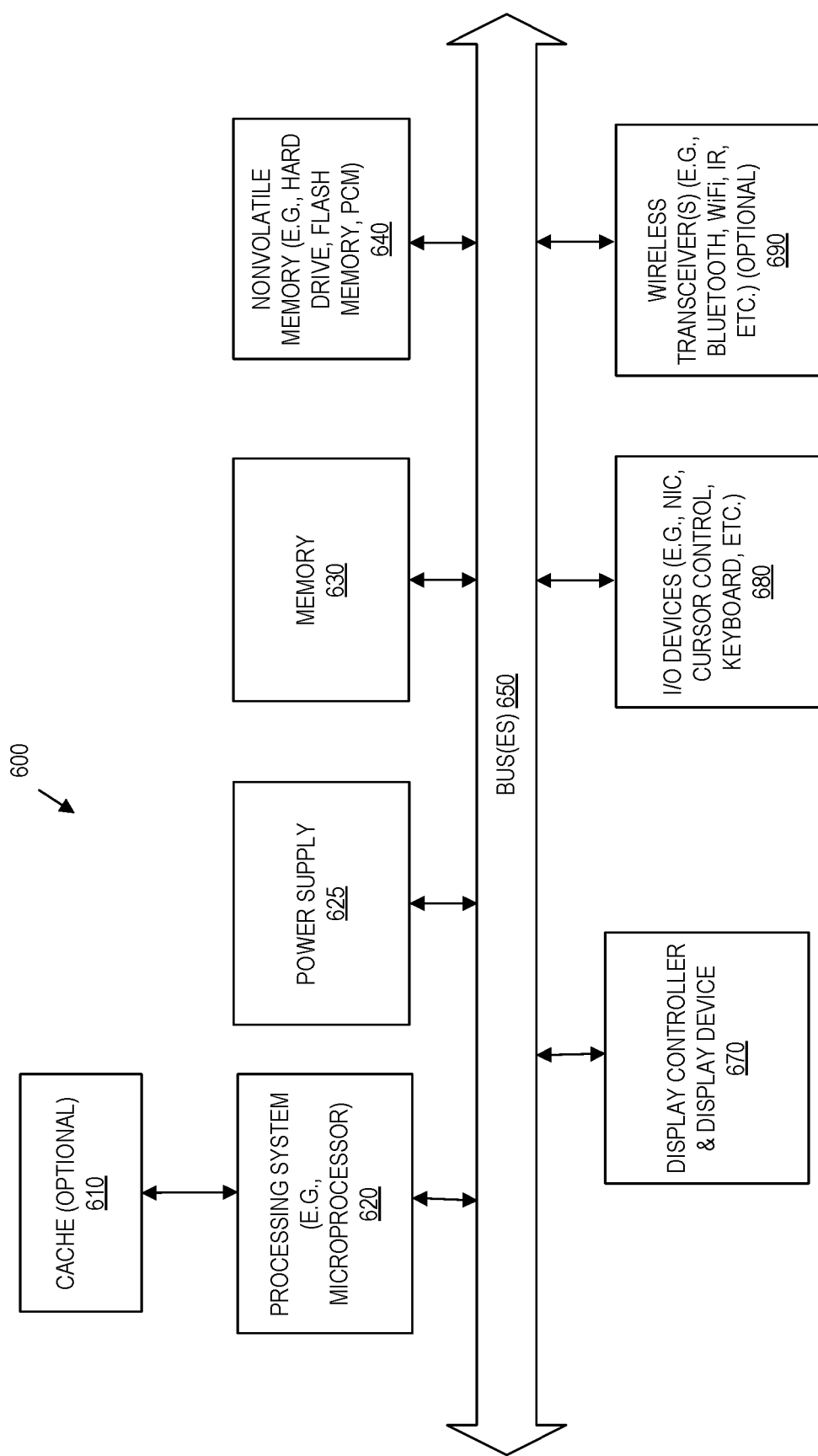
FIG. 6 illustrates a block diagram of an exemplary computer system that can be used for dynamically optimizing a script library in accordance with some embodiments.

FIG. 6 illustrates a block diagram of an exemplary computer system that can be used for dynamically optimizing a script library in accordance with some embodiments. The computer system 600, which is an electronic device, includes the bus(es) 650 which is coupled with the processing system 620, power supply 625, memory 630, and the nonvolatile memory 640 (e.g., a hard drive, flash memory, Phase-Change Memory (PCM), etc.). The bus(es) 650 may be connected to each other through various bridges, controllers, and/or adapters as is well known in the art. The processing system '620 may retrieve instruction(s) from the memory 630 and/or the nonvolatile memory 640, and execute the instructions to perform operations described herein. The bus 650 interconnects the above components together and also interconnects those components to the display controller & display device 670, Input/Output devices 680 (e.g., NIC (Network Interface Card), a cursor control (e.g., mouse, touchscreen, touchpad, etc.), a keyboard, etc.), and the optional wireless transceiver(s) 690 (e.g., Bluetooth, WiFi, Infrared, etc.). In one embodiment, the client device 110A-N, the proxy server 120, and/or the service server 125 can take the form of the computer system 600 and perform the operations described with reference to FIGS. 1-5.

The techniques shown in the figures can be implemented using code and data stored and executed on one or more electronic devices (e.g., a client device, a proxy server, an origin server, a service server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a proxy server of a cloud-based proxy service of automatic generation of a content security policy for a network resource, the method comprising:
    receiving from a first client device a first request for a first network resource, wherein the first client device is authenticated;
    retrieving the first network resource;
    transmitting a first response to the first client device, the first response including the first network resource and a content tracker that causes the first client device to report information to the proxy server on one or more additional network resources that are identified when the first client device interprets the first network resource;
    generating a content security policy that is determined based on the information on the one or more additional network resources;
    receiving, from a second client device, a second request for the first network resource; and
    transmitting a second response to the second client device, the second response including the first network resource and the content security policy that is determined based on the information on the one or more additional network resources, wherein the content security policy identifies at least one of a source and a type of a network resource that the second client device can securely access when interpreting the first network resource.

2. The method of claim 1, wherein the content security policy identifies the one or more additional network resources as network resources that the second client device is allowed to access when interpreting the first network resource.

3. The method of claim 1, wherein the content tracker includes a location at which the information on the additional network resources is to be transmitted by the first client device.

4. The method of claim 1, wherein the content tracker is an initial content security policy that is to be enforced by the first client device when the first client device interprets the first network resource, and the content security policy is a new content security policy determined based on the information on the one or more additional network resources that are identified when the first client device interprets the first network resource and enforces the initial content security policy.

5. The method of claim 4, wherein the initial content security policy causes the first client device to report the one or more additional network resources accessed by the first client device when the first client device interprets the first network resource, and wherein the initial content security policy does not cause the first client device to block the one or more additional network resources.

6. The method of claim 4, wherein the initial content security policy causes the first client device to report and block the one or more additional network resources accessed by the first client device when the first client device interprets the first network resource.

7. The method of claim 1, wherein the content tracker includes code injected in the first network resource to track the additional network resources that are accessed when the first client device interprets the first network resource.

8. The method of claim 1, wherein transmitting the first network resource includes:
    removing inline code from the first network resource;
    storing the inline code in an external file at a first location; and
    adding the first location to the first network resource to allow for tracking the code by the content tracker.

9. The method of claim 1, wherein an additional network resource from the additional network resources is identified when a request for the additional network resource is transmitted from the first client device when interpreting the first network resource.

10. The method of claim 1 further comprising:
    determining one or more directives of a Hypertext Transport Protocol (HTTP) content security policy (CSP) header based on the content security policy; and
    wherein the transmitting the second response includes transmitting the HTTP CSP header including the one or more directive with the first network resource to cause the second client device to enforce the content security policy.

11. A proxy server of a cloud-based proxy service for automatic generation of a content security policy for a network resource, the proxy server comprising:
    one or more processors; and
    a non-transitory computer readable storage medium that stores code, which when executed by the one or more processors causes the proxy server to perform the following operations:
        receiving from a first client device a first request for a first network resource, wherein the first client device is authenticated,
        retrieving the first network resource,
        transmitting a first response to the first client device, the first response including the first network resource and a content tracker that causes the first client device to report information to the proxy server on one or more additional network resources that are identified when the first client device interprets the first network resource,
        generating a content security policy that is determined based on the information on the one or more additional network resources;
        receiving, from a second client device, a second request for the first network resource, and
        transmitting a second response to the second client device, the second response including the first network resource and the content security policy that is determined based on the information on the one or more additional network resources, wherein the content security policy identifies at least one of a source and a type of a network resource that the second client device can securely access when interpreting the first network resource.

12. The proxy server of claim 11, wherein the content security policy identifies the one or more additional network resources as network resources that the second client device is allowed to access when interpreting the first network resource.

13. The proxy server of claim 11, wherein the content tracker includes a location at which the information on the additional network resources is to be transmitted by the first client device.

14. The proxy server of claim 11, wherein the content tracker is an initial content security policy that is to be enforced by the first client device when the first client device interprets the first network resource, and the content security policy is a new content security policy determined based on the information on the one or more additional network resources that are identified when the first client device interprets the first network resource and enforces the initial content security policy.

15. The proxy server of claim 14, wherein the initial content security policy causes the first client device to report the one or more additional network resources accessed by the first client device when the first client device interprets the first network resource, and wherein the initial content security policy does not cause the first client device to block the one or more additional network resources.

16. The proxy server of claim 14, wherein the initial content security policy causes the first client device to report and block the one or more additional network resources accessed by the first client device when the first client device interprets the first network resource.

17. The proxy server of claim 11, wherein the content tracker includes code injected in the first network resource to track the additional network resources that are accessed when the first client device interprets the first network resource.

18. The proxy server of claim 11, wherein the transmitting the first network resource includes:
  removing inline code from the first network resource;
  storing the inline code in an external file at a first location; and
  adding the first location to the first network resource to allow for tracking the code by the content tracker.

19. The proxy server of claim 11, wherein an additional network resource from the additional network resources is identified when a request for the additional network resource is transmitted from the first client device when interpreting the first network resource.

20. The proxy server of claim 11, wherein the operations further comprise:
  determining one or more directives of a Hypertext Transport Protocol (HTTP) content security policy (CSP) header based on the content security policy; and
  wherein the transmitting the second response includes transmitting the HTTP CSP header including the one or more directive with the first network resource to cause the second client device to enforce the content security policy.

21. A non-transitory computer readable storage medium that stores instructions which when executed by one or more processors of a proxy server of a cloud-based proxy server cause said processors to perform the following operations for automatic generation of a content security policy for a network resource, the operations comprising:
  receiving from a first client device a first request for a first network resource, wherein the first client device is authenticated;
  retrieving the first network resource;
  transmitting a first response to the first client device, the first response including the first network resource and a content tracker that causes the first client device to report information to the proxy server on one or more additional network resources that are identified when the first client device interprets the first network resource;
  generating a content security policy that is determined based on the information on the one or more additional network resources;
  receiving, from a second client device, a second request for the first network resource; and
  transmitting a second response to the second client device, the second response including the first network resource and the content security policy that is determined based on the information on the one or more additional network resources, wherein the content security policy identifies at least one of a source and a type of a network resource that the second client device can securely access when interpreting the first network resource.

22. The non-transitory computer readable storage medium of claim 21, wherein the content security policy identifies the one or more additional network resources as network resources that the second client device is allowed to access when interpreting the first network resource.

23. The non-transitory computer readable storage medium of claim 21, wherein the content tracker includes a location at which the information on the additional network resources is to be transmitted by the first client device.

24. The non-transitory computer readable storage medium of claim 21, wherein the content tracker is an initial content security policy that is to be enforced by the first client device when the first client device interprets the first network resource, and the content security policy is a new content security policy determined based on the information on the one or more additional network resource that are identified when the first client device interprets the first network resource and enforces the initial content security policy.

25. The non-transitory computer readable storage medium of claim 24, wherein the initial content security policy causes the first client device to report the one or more additional network resources accessed by the first client device when the first client device interprets the first network resource, and wherein the initial content security policy does not cause the first client device to block the one or more additional network resources.

26. The non-transitory computer readable storage medium of claim 24, wherein the initial content security policy causes the first client device to report and block the one or more additional network resources accessed by the first client device when the first client device interprets the first network resource.

27. The non-transitory computer readable storage medium of claim 21, wherein the content tracker includes code injected in the first network resource to track the additional network resources that are accessed when the first client device interprets the first network resource.

28. The non-transitory computer readable storage medium of claim 21, wherein transmitting the first network resource includes:
  removing inline code from the first network resource;
  storing the inline code in an external file at a first location; and
  adding the first location to the first network resource to allow for tracking the code by the content tracker.

29. The non-transitory computer readable storage medium of claim 21, wherein an additional network resource from the additional network resources is identified when a request for the additional network resource is transmitted from the first client device when interpreting the first network resource.

30. The non-transitory computer readable storage medium of claim 21, wherein the operations further comprise:
- determining one or more directives of a Hypertext Transport Protocol (HTTP) content security policy (CSP) header based on the content security policy; and
- wherein the transmitting the second response includes transmitting the HTTP CSP header including the one or more directive with the first network resource to cause the second client device to enforce the content security policy.

* * * * *